US012741345B2

(12) United States Patent
Manjon Fernandez et al.

(10) Patent No.: US 12,741,345 B2
(45) Date of Patent: Sep. 22, 2026

(54) WELDING FLUX COMPOSITION AND CORRESPONDING METHOD FOR WELDING METALS

(71) Applicant: VERDICIO SOLUTIONS A.I.E., Madrid (ES)

(72) Inventors: Alvaro Manjon Fernandez, Oviedo Asturias (ES); Sivasambu Bohm, Godmanchester (GB); Marcos Perez Rodriguez, Cangas Del Narcea Asturias (ES); Christopher Gerritsen, Sint-Amandsberg (BE)

(73) Assignee: VERDICIO SOLUTIONS A.I.E., Madrid (ES)

( * ) Notice: Subject to any disclaimer, the term of this patent is extended or adjusted under 35 U.S.C. 154(b) by 458 days.

(21) Appl. No.: 18/031,426

(22) PCT Filed: Oct. 21, 2020

(86) PCT No.: PCT/IB2020/059875
§ 371 (c)(1),
(2) Date: Apr. 12, 2023

(87) PCT Pub. No.: WO2022/084719
PCT Pub. Date: Apr. 28, 2022

(65) Prior Publication Data

US 2023/0381897 A1 Nov. 30, 2023

(51) Int. Cl.
*B23K 35/368* (2006.01)
*B23K 9/00* (2006.01)
*B23K 26/21* (2014.01)
*B23K 35/02* (2006.01)
*B23K 35/362* (2006.01)

(52) U.S. Cl.
CPC .............. *B23K 35/368* (2013.01); *B23K 9/00* (2013.01); *B23K 26/21* (2015.10); *B23K 35/0266* (2013.01); *B23K 35/362* (2013.01)

(58) Field of Classification Search
CPC ........ B23K 35/368; B23K 9/00; B23K 26/21; B23K 35/0266; B23K 35/362; B23K 35/26; B23K 35/365; B23K 35/3608
See application file for complete search history.

(56) References Cited

U.S. PATENT DOCUMENTS 3,588,432 A 6/1971 Arnoldy et al.
3,627,574 A 12/1971 DeLong et al.
4,314,136 A 2/1982 Kotecki et al.
4,723,060 A 2/1988 Arnoldy et al.
6,339,209 B1 1/2002 Kotecki et al.
6,664,508 B1 12/2003 Johnson et al.
2004/0009300 A1 1/2004 Shimakura et al.
2006/0219685 A1* 10/2006 Karogal ............... B23K 35/368 219/145.22
2013/0299460 A1 11/2013 Wu et al.
2014/0124482 A1 5/2014 Katiyar et al.
2015/0027993 A1 1/2015 Bruck et al.
2019/0040503 A1* 2/2019 Martin .................. B33Y 70/00

FOREIGN PATENT DOCUMENTS

BE 754889 A 1/1971
CA 2535145 A1 12/2006
CN 1864910 A 11/2006
CN 101947703 A 1/2011
CN 105081620 A 11/2015
CN 105269183 A 1/2016
CN 105431254 A 3/2016
EP 1537940 A1 6/2005
EP 1698428 A1 9/2006
EP 1710042 A1 10/2006
EP 1710043 A1 10/2006
GB 1 336182 A 11/1973
JP 2006289494 A 10/2006
WO WO0016940 3/2000
WO WO 0059674 A1 10/2000
WO WO 2009/086193 A2 7/2009
WO WO 2020/212735 A1 10/2020
WO WO 2020212885 A1 10/2020
WO WO 2022/084716 A1 4/2022
WO WO 2022/084717 A1 4/2022
WO WO 2022/084718 A1 4/2022
WO WO 2022/084719 A1 4/2022
WO WO 2022084720 A1 4/2022

OTHER PUBLICATIONS

Search Report of PCT/IB2020/059876 of Nov. 12, 2020 and International Report on Patentability.
Search Report of PCT/IB2020/059872 of Jun. 22, 2021 and International Report on Patentability.
Search Report of PCT/IB2020/059874 of Aug. 7, 2021 and International Report on Patentability.
Search Report of PCT/IB2020/059875 of Jun. 22, 2021 and International Report on Patentability.
Search Report of PCT/IB2020/059871 of Jun. 7, 2021 and International Report on Patentability.
Balos Sebastian et al, "Metal Oxide Nanoparticle-Based Coating as a Catalyzer for A-TIG Welding: Critical Raw Material Perspective", Metals, (May 15, 2019), vol. 9, No. 5, doi:10.3390/met9050567, p. 567.

* cited by examiner

*Primary Examiner* — Adil A. Siddiqui
(74) *Attorney, Agent, or Firm* — Davidson Kappel LLC

(57) ABSTRACT

A welding flux including a titanate and a nanoparticulate Niobium compound chosen from among Niobium oxides, alkali niobates and mixtures thereof.

25 Claims, No Drawings

WELDING FLUX COMPOSITION AND CORRESPONDING METHOD FOR WELDING METALS

The present invention relates to the welding of metallic substrates, in particular in the case where at least one of the metallic substrates is a steel substrate. It also relates to the composition of a welding flux used to improve the quality of the weld. The welding flux can be included in a solution to be locally applied on the steel substrate so as to form a pre-coating or it can be included in a flux-cored wire to be used as an alternative to the pre-coating. The invention also relates to the corresponding methods for the manufacture of a welded joint. It is particularly well suited for construction, shipbuilding, transportation industry (rail and automotive), energy-related structures, oil&gas and offshore industries.

BACKGROUND

It is well known to weld metallic substrates with different welding techniques such as Gas Metal Arc Welding (GMAW), Gas Tungsten Arc Welding (GTAW) also known as Tungsten Inert Gas Welding (TIGW), Submerged Arc Welding (SAW), Laser Beam Welding (LBW), Narrow Gap Welding, also known as narrow groove welding, laser arc hybrid welding. The welding can be done with the help of a welding flux for increasing penetration in the substrates. This welding flux differs from the possible shielding flux mainly used to protect the welded zone from oxidation during welding.

It is also known to weld metallic substrates with a filler wire notably when a gap has to be filled. The filler wire can feed the weld from the side (as in Gas Tungsten Arc Welding and Laser Welding) or it can be the consumable electrode (as in Submerged Arc Welding, Gas Metal Arc Welding, Gas Shielded Flux Cored Arc Welding, Narrow Gap Welding and Hybrid Laser Welding, where the arc head is a Gas Metal Arc). In some cases, the filler wire is in the form of a flux-cored wire, i.e. a wire that is hollow and filled with a flux containing components improving the performances.

The patent application WO00/16940 discloses that deep penetration gas tungsten arc welds are achieved using titanates such as $Na_2Ti_3O_7$ or $K_2TiO_3$. Titanate is added to the melt pool as part of a welding flux or as part of a filler wire to afford deep penetration welds in carbon steels, chromium-molybdenum steels, stainless steels as well as nickel-based alloys. The titanate compounds of WO00/16940 are used in the form of high-purity powders of about 325 mesh or finer, 325 mesh corresponding to 44 μm. To control arc wander, bead consistency, and slag and surface appearance of the weldments, various additional components may be optionally added to the titanate-based filler wire, including transition metal oxides such as TiO, $TiO_2$, $Cr_2O_3$, and $Fe_2O_3$, silicon dioxide, manganese silicides, fluorides and chlorides. All compounds of the flux have micrometric dimensions.

SUMMARY OF THE INVENTION

Although the penetration is improved with the flux discloses in WO00/16940, the penetration is not optimum for steel substrates.

There is thus a need for improving the weld penetration in steel substrates and therefore the mechanical properties of welded steel substrates. There is also a need for increasing the deposition rate and productivity of the welding.

To this end, the invention relates to a welding flux comprising a titanate and a nanoparticulate Niobium compound chosen from among Niobium oxides, alkali niobates and mixtures thereof.

The welding according to the invention may also have the optional features listed below, considered individually or in combination:

- the nanoparticulate Niobium compound is chosen from among NbO, $NbO_2$ and $Nb_2O_5$ and mixtures thereof,
- the percentage of the nanoparticulate Niobium compound in the flux is below or equal to 80 wt. %,
- the percentage of the nanoparticulate Niobium compound in the flux is comprised between 2 and 30 wt. %,
- the nanoparticles of the nanoparticulate Niobium have a size comprised between 5 and 150 nm,
- the titanate is chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ and mixtures thereof,
- the percentage of titanate in the flux is above or equal to 45 wt. %,
- the diameter of the titanate is between 1 and 40 μm,
- the welding flux further comprises at least one additional nanoparticulate oxide chosen from $TiO_2$, $SiO_2$, $ZrO_2$, $Y_2O_3$, $Al_2O_3$, $MoO_3$, $CrO_3$, $CeO_2$, $La_2O_3$ and mixtures thereof,
- the welding flux further comprises microparticulate compounds selected among microparticulate oxides and/or microparticulate fluorides,
- the welding flux further comprises microparticulate compounds selected from the list consisting of $CeO_2$, $Na_2O$, $Na_2O_2$, $NaBiO_3$, NaF, $CaF_2$, cryolite ($Na_3AlF_6$) and mixtures thereof,
- the welding flux further comprises a solvent,
- the welding flux comprises from 1 to 200 g/L of nanoparticulate Niobium compound,
- the welding flux comprises from 100 to 500 g/L of titanate,
- the welding flux further comprises a binder precursor.

The invention also relates to a method for the manufacture of a pre-coated steel substrate comprising the step of depositing at least partially on a steel substrate the welding flux according to the invention.

The invention also relates to a pre-coated steel substrate, obtainable by the method according to the invention, at least partially coated with a pre-coating comprising a titanate and a nanoparticulate Niobium compound chosen from among Niobium oxides, alkali niobates and mixtures thereof.

The invention also relates to a method for the manufacture of a welded joint comprising the following successive steps:

I. The provision of at least two metallic substrates wherein at least one metallic substrate is a pre-coated steel substrate according to the invention, and
II. The welding of the at least two metallic substrates.

The invention also relates to a flux-cored wire comprising the flux according to the invention.

The invention also relates to a method for the manufacture of a welded joint comprising performing arc welding or laser welding on a steel material with a flux-cored wire according to the invention.

The invention also relates to a method for the manufacture of a welded joint comprising the following successive steps:

I. The provision of at least two metallic substrates wherein at least one metallic substrate is a steel substrate, and
II. The welding of the at least two metallic substrates with a welding head while, simultaneously, applying on the at least two metallic substrates, ahead of the welding head, a welding flux according to the invention.

DETAILED DESCRIPTION

The following terms are defined:

Nanoparticles are particles between 1 and 200 nanometers (nm) in size. The term "nanoparticulate" refers to compounds in the form of nanoparticles in the above-mentioned range.

Titanate refers to inorganic compounds containing titanium, oxygen and at least one additional element, such as an alkali metal element, alkaline-earth element, transition metal element or metallic element. They can be in the form of their salts.

"coated" means that the steel substrate is at least locally covered with the pre-coating. The covering can be for example limited to the area where the steel substrate will be welded. "coated" inclusively includes "directly on" (no intermediate materials, elements or space disposed therebetween) and "indirectly on" (intermediate materials, elements or space disposed therebetween). For example, coating the steel substrate can include applying the pre-coating directly on the substrate with no intermediate materials/elements therebetween, as well as applying the pre-coating indirectly on the substrate with one or more intermediate materials/elements therebetween (such as an anticorrosion coating).

Without willing to be bound by any theory, it is believed that the welding flux and the corresponding pre-coating and flux-cored wire mainly modify the melt pool physics. It seems that, in the present invention, not only the nature of the compounds, but also the size of the oxide particles being equal to or below 100 nm modifies the melt pool physics.

Indeed, the flux is melted and incorporated in the molten metal in the form of dissolved species and, if the welding technique involves an arc, in the arc in the form of ionized species. Thanks to the presence of titanate and nanoparticulate Niobium compound in the arc, the arc is constricted.

Moreover, the flux dissolved in the molten metal modifies the Marangoni flow, which is the mass transfer at the liquid-gas interface due to the surface tension gradient. In particular, the components of the flux modify the gradient of surface tension along the interface. This modification of surface tension results in an inversion of the fluid flow towards the center of the weld pool. This inversion leads to improvements in the weld penetration and in the welding efficiency leading to an increase in deposition rate and thus in productivity. Without willing to be bound by any theory, it is believed that the nanoparticles dissolve at lower temperature than microparticles and therefore more oxygen is dissolved in the melt pool, which activate the reverse Marangoni flow.

When the welding technique involves an arc, the effect of the reverse Marangoni flow combines with a higher plasma temperature due to arc constriction, which further improve the weld penetration and the material deposition rate. When the welding technique involves a laser beam, the reverse Marangoni flow contributes to the retention of a proper keyhole shape, which, in turn, prevents gas entrapment and thus pores in the weld.

Furthermore, the dissolved oxygen acts as a surfactant, improving the wetting of the molten metal on the base metal and therefore avoiding critical defects prone to appear in the weldment, such as lack of edge fusion.

Moreover, as the components of the flux make the surface tension increase with temperature, the wettability of the weld material increases along the edges which are colder than the center of the melt pool, which prevents slag entrapment.

When the welding technique involves a laser beam, the flux modifies the plasma plume interaction with the laser beam. In particular, the increase in oxygen due to the dissolution of the flux reduces the scattering of the laser beam. Consequently, the laser spot diameter is reduced while the keyhole effect is enhanced. This allows the energy beam to penetrate even more deeply and to be delivered very efficiently into the join. This increases the weld penetration and minimizes the heat affected zone, which in turn limits part distortion.

The invention will be better understood by reading the following description, which is provided purely for purposes of explanation and is in no way intended to be restrictive.

The invention relates to the welding of a steel substrate. Preferably, the steel substrate is carbon steel.

The steel substrate can be optionally coated on at least part of one of its sides by an anti-corrosion coating. Preferably, the anti-corrosion coating comprises a metal selected from the group consisting of zinc, aluminium, copper, silicon, iron, magnesium, titanium, nickel, chromium, manganese and their alloys.

In a preferred embodiment, the anti-corrosion coating is an aluminium-based coating comprising less than 15% Si, less than 5.0% Fe, optionally 0.1 to 8.0% Mg and optionally 0.1 to 30.0% Zn, the remainder being Al and the unavoidable impurities resulting from the manufacturing process. In another preferred embodiment, the anti-corrosion coating is a zinc-based coating comprising 0.01-8.0% Al, optionally 0.2-8.0% Mg, the remainder being Zn and the unavoidable impurities resulting from the manufacturing process.

The anti-corrosion coating is preferably applied on both sides of the steel substrate.

The steel material can be welded to a steel substrate of the same composition or of a different composition. It can also be welded to another metal, such as for example, aluminium.

The welding flux comprises a titanate and a nanoparticulate Niobium compound chosen from among Niobium oxides, alkali niobates and mixtures thereof. In other words, the pre-coating comprises a titanate and at least one nanoparticulate Niobium compound, wherein the at least one nanoparticulate Niobium compound is selected from the group consisting of Niobium oxides, alkali niobates and mixtures thereof. This means that the pre-coating doesn't comprise any other nanoparticulate Niobium compound than the ones listed.

The titanate is selected from the group of titanates consisting of alkali metal titanates, alkaline-earth titanates, transition metal titanates, metal titanates and mixtures thereof. The titanate is more preferably chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ and mixtures thereof. It is believed that these titanates further increase the penetration depth based on the effect of the reverse Marangoni flow. It is the inventors understanding that all titanates behave, in some measure, similarly and increase the penetration depth. All titanates are thus part of the invention. The person skilled in the art will know which one has to be selected depending on the specific case. To do so, he will take into account how easily the titanates melt and dissolve, how much they increase the dissolved oxygen content, how the additional element of the titanate affects the melt pool physics and the microstructure of the final weld. For example, $NaTiO_7$ is favored due to the presence of Na that improves the slag formation and detachment.

Preferably, the titanate has a diameter between 1 and 40 μm, more preferably between 1 and 20 μm and advantageously between 1 and 10 μm. It is believed that this titanate diameter further improves the arc constriction and the reverse Marangoni effect. Moreover, having small micrometric titanate particles increases the specific surface area available for the mix with the nanoparticulate Niobium compound and have the latter further adhere to the titanate particles.

Preferably, the percentage in weight of the titanate in dry weight of welding flux is above or equal to 45%, more preferably between 45% and 90% and even more preferably between 55% and 87%.

The nanoparticulate Niobium compound is chosen from among Niobium oxides, alkali niobates and mixtures thereof. Niobium oxides can notably be selected from NbO, $NbO_2$ and $Nb_2O_5$. Alkali niobates can notably be selected from $LiNbO_3$, $NaNbO_3$ and $KNbO_3$. These nanoparticles dissolve easily in the melt pool, provide oxygen to the melt pool and, consequently, improve the wettability and the material deposition and allow for a deeper weld penetration. Contrary to other oxides, such as CaO, MgO, $B_2O_3$, $Co_3O_4$ or $Cr_2O_3$, they do not tend to form brittle phases, they do not have a high refractory effect that would prevent the heat from correctly melting the steel and their metal ions do not tend to recombine with oxygen in the melt pool. Moreover, they raise less health and safety concerns than other nanoparticulate oxides and can thus replace very efficiently some of those and even improve the results.

The nanoparticulate Niobium compound is preferably $Nb_2O_5$ since it has the highest oxygen content, it is stable and easily available at a reasonable cost.

Preferably, the nanoparticles of the nanoparticulate Niobium compound have a size comprised between 5 and 150 nm, more preferably between 50 and 150 nm.

The welding flux can further comprise at least one additional nanoparticulate oxide chosen from $TiO_2$, $SiO_2$, $ZrO_2$, $Y_2O_3$, $Al_2O_3$, $MoO_3$, $CrO_3$, $CeO_2$, $La_2O_3$ and mixtures thereof. These nanoparticulate oxides dissolve also easily in the melt pool and further improve the wettability, the material deposition and the weld penetration.

Preferably, the additional nanoparticulate oxide is $SiO_2$, which further increases the penetration depth and eases the slag removal.

Examples of mixtures of additional nanoparticulate oxides are:

- Yttria-stabilized zirconia (YSZ) which is a ceramic in which the cubic crystal structure of zirconium dioxide ($ZrO_2$) is made stable at room temperature by an addition of yttrium oxide ($Y_2O_3$),
- A 1:1:1 combination of $La_2O_3$, $ZrO_2$ and $Y_2O_3$, which helps adjusting the refractory effect and promote the formation of inclusions.

Preferably, the nanoparticles of the additional nanoparticulate oxides have a size comprised between 1 and 100 nm, more preferably between 5 and 60 nm. it is believed that this nanoparticles diameter further improves the homogeneous distribution of the flux.

Preferably, the percentage in weight of the nanoparticles in dry weight of welding flux (either as Niobium compound alone or in combination with other nanoparticulate oxides) is below or equal to 80%, preferably between 2 and 50%, more preferably between 10 and 40%. More preferably, the percentage in weight of the nanoparticulate Niobium compound in dry weight of welding flux is comprised between 2 and 30%. More preferably, the percentage in weight of the additional nanoparticulate oxide in dry weight of welding flux, if any, is comprised between 5 and 20%.

According to another variant of the invention, the flux further comprises microparticulate compounds, such as microparticulate oxides and/or microparticulate fluorides, such as, for example, $Na_2O$, $Na_2O_2$, $CeO_2$, $NaBiO_3$, NaF, $CaF_2$, cryolite ($Na_3AlF_6$). Moving from nanoparticles to microparticles for some of the nanoparticulate oxides listed above alleviate the health and safety concerns related to the use of some of these oxides. $Na_2O$, $Na_2O_2$, $NaBiO_3$, NaF, $CaF_2$, cryolite can be added to improve the slag formation so that slag entrapment is further prevented. They also help forming an easily detachable slag. The flux can comprise from 0.1 to wt %, in dry weight of welding flux, of $Na_2O$, $Na_2O_2$, $NaBiO_3$, NaF, $CaF_2$, cryolite or mixtures thereof.

According to one embodiment of the invention, the flux described above is contained in the sheath of a flux-cored wire. Such configuration is particularly advantageous compared to having the same composition applied as a pre-coating on the substrate to be welded. First of all, the extra step of coating the substrate before welding is suppressed. Moreover, there is no need to remove the excess of pre-coating along the weldment after welding. In this regard, the particles are also used more efficiently since all the particles provided by the flux-cored wire dissolve in the melt pool. Finally, solvents and spray mist during the coating step are avoided which is beneficial for the health and safety of the operators.

According to one variant of the invention, the flux in the flux-cored wire consists of a titanate and a nanoparticulate Niobium compound.

According to another variant of the invention, the flux in the flux-cored wire can further comprise iron powder as balance. The balance can possibly represent up to 55 wt % of the flux.

The material of the sheath is not particularly limited in the case of the present invention. It can be steel, for example, copper-coated C—Mn steel.

The wire has usually a diameter comprised between 0.8 and 4 mm. As for the sheath, its thickness varies depending on the percent fill selected. The percent fill is the ratio of the weight of the flux ingredients or "fill" compared to the total weight of the wire.

In term of process, in a first step, the titanate and nanoparticulate Niobium compound are preferably mixed. It can be done either in wet conditions with a solvent such as acetone or in dry conditions for example in a 3D powder shaker mixer. The mixing favors the aggregation of the nanoparticles on the titanate particles which prevents the unintentional release of nanoparticles in the air, which would be a health and safety issue. In a second step, the flux thus obtained is deposited on a thin, narrow strip which, in a previous step, has gone through forming rolls to form the strip in a U-shaped cross-section. The flux-filled U-shaped strip then flows through special closing rolls which form it into a tube and tightly compress the core materials. This tube is then pulled through draw dies to reduce its diameter and further compress the core materials. Drawing tightly seals the sheath and additionally secures the core materials inside the tube under compression, thus avoiding discontinuities in the flux.

Once a flux-cored wire according to the invention has been provided, a welded joint can be manufactured by performing arc welding or laser welding on a steel material with the flux-cored wire. The kind of welding technique is not limited as long as it is compatible with the flux-cored wire according to the invention and used either as a filler wire feeding the weld from the side (as in Gas Tungsten Arc Welding and Laser Welding) or as a consumable electrode (as in Submerged Arc Welding, Gas Metal Arc Welding, Gas Shielded Flux Cored Arc Welding, Narrow Gap Welding and Hybrid Laser Welding, where the arc head is a Gas Metal Arc). Depending on the welding technique, the welded zone can be covered by a shielding flux. The shielding flux protects the welded zone from oxidation during welding.

According to another embodiment of the invention, the flux described above is applied at least partially on the steel substrate so as to form a pre-coating.

In this case, the flux can advantageously further comprise a solvent. It allows for a well dispersed pre-coating. Preferably, the solvent is volatile at ambient temperature. For example, the solvent is chosen from among: water, volatile organic solvents such as acetone, methanol, isopropanol, ethanol, ethyl acetate, diethyl ether and non-volatile organic solvents such as ethylene glycol.

In particular, the solvented flux comprises from 100 to 500 g/L of titanate, more preferably between 175 and 250 $g \cdot L^{-1}$. In particular, it comprises from 1 to 200 $g \cdot L^{-1}$ of nanoparticulate Niobium compound, more preferably between 5 and 80 $g \cdot L^{-1}$. Thanks to these concentrations in titanate and nanoparticulate Niobium compound, the quality of the weld obtained with the help of the corresponding pre-coating is further improved.

According to one variant of the invention, the flux further comprises a binder precursor to embed the titanate and the nanoparticulate Niobium compound and to improve the adhesion of the pre-coating on the steel substrate. Preferably, the binder precursor is a sol of at least one organofunctional silane. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Preferably, the binder precursor is added in an amount of 40 to 400 $g \cdot L^{-1}$ of the pre-coating solution.

In term of process, in a first step, the titanate and nanoparticulate Niobium compound are preferably mixed. It can be done either in wet conditions with a solvent such as acetone or in dry conditions for example in a 3D powder shaker mixer. The mixing favors the aggregation of the nanoparticles on the titanate particles which prevents the unintentional release of nanoparticles in the air, which would be a health and safety issue. In a second step, the flux is applied at least partially on the steel substrate so as to form a pre-coating.

The deposition of the flux can be notably done by spin coating, spray coating, dip coating or brush coating.

Preferably, the flux is deposited locally only. In particular, the flux is applied in the area where the steel substrate will be welded. It can be on the edge of the steel substrate to be welded, on one part of one side of the substrate to be welded on one sidewall or on one beveled edge if any.

Once the flux has been applied on the steel substrate, it can optionally be dried. The drying can be performed by blowing air or inert gases at ambient or hot temperature. When the flux comprises a binder, the drying step is preferably also a curing step during which the binder is cured. The curing can be performed by Infra-Red (IR), Near Infra-Red (NIR), conventional oven.

Preferably, the drying step is not performed when the solvent is volatile at ambient temperature. In that case, the solvent evaporates leading to a pre-coating on the steel substrate.

According to one variant of the invention, once the pre-coating is formed on the steel substrate and dried, it consists of a titanate and a nanoparticulate Niobium compound.

According to another variant of the invention, the pre-coating further comprises at least one binder embedding the titanate and the nanoparticulate Niobium compound and improving the adhesion of the pre-coating on the steel substrate. This improved adhesion further prevents the particles of the pre-coating from being blown away by the flow of the shielding gas when such a gas is used. Preferably, the binder is purely inorganic, notably to avoid fumes that an organic binder could possibly generate during welding. Examples of inorganic binders are sol-gels of organofunctional silanes or siloxanes. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Amino-alkyl silanes are particularly preferred as they are greatly promoting the adhesion and have a long shelf life. Preferably, the binder is added in an amount of 1 to 20 wt % of the pre-coating.

Preferably the thickness of the pre-coating is between 10 to 140 μm, more preferably between 30 to 100 μm.

Once the pre-coating has been formed on a part of the steel substrate, this part can be welded to another metallic substrate. The kind of welding technique is not limited. It can be, for example, Gas Metal Arc Welding (GMAW), Gas Tungsten Arc Welding (GTAW) also known as Tungsten Inert Gas Welding (TIGW), Submerged Arc Welding (SAW), Laser Beam Welding (LBW), Narrow Gap Welding, also known as narrow groove welding or laser arc hybrid welding.

According to another embodiment of the invention, the welding flux described above is applied directly on the metallic substrates during the welding, in particular to the weld zone.

In particular, while the two metallic substrates are welded, the welding flux is simultaneously applied at least partially on the two metallic substrates. The welding flux is applied ahead of the welding equipment, in particular ahead of the welding head. Welding head refers here to the electrode, either consumable or not, which creates an arc or to the laser head, depending on the welding technique. This way the components of the welding flux are melted and dissolved in the melt pool when the energy applied through the welding head hits the portion of substrate covered with the welding flux. The dissolved titanate and nanoparticulate Niobium compound have the effects presented above.

The welding flux is preferably applied on a portion of the metallic substrate just before this portion is hit by the energy applied through the welding head.

Preferably, the welding flux is applied along the edges of the metallic substrates to be welded on a width at least equal to the weld width, so that the welding flux is efficiently dissolved in the melt pool.

Preferably, the welding flux is stored in a flux hopper. This hopper is positioned ahead of the welding equipment, in particular ahead of the welding head, and moves along with it. During welding, the hopper deposits the welding flux on a small portion of the metallic substrates ahead of the welding head. The flux hopper controls the rate of flux deposition.

In one variant of the invention, the welding flux is applied on the two metallic substrates before applying a shielding flux. Ahead of the welding head, there is first the flux hopper stocking the shielding flux and then the flux hopper stocking the welding flux. In other words, the welding flux hopper is further ahead of the welding head than the shielding flux hopper. Consequently, the welding flux is applied in the first place on the metallic substrates and the shielding flux is applied in the second place so that it covers the welding flux. The welded zone is thus protected from oxidation during welding. From a process perspective, the application of the welding flux and the application of the shielding flux are both simultaneous with the welding.

In another variant of the invention, the welding flux is also a shielding flux. It preferably comprises lime, silica, manganese oxide and calcium fluoride in the form of particles of micrometric and/or millimetric size. These compounds provide the shielding effect to the flux in addition to the effects provided by the titanate and nanoparticulate Niobium compound. The welded zone is thus protected from oxidation during welding.

In that case, the titanate and nanoparticulate Niobium compound are mixed with additional components, such as lime, silica, manganese oxide and calcium fluoride in the form of particles of micrometric and/or millimetric size at an earlier stage and the mixture is then applied on the two metallic substrates, preferably with a flux hopper.

The kind of welding technique to be used with this embodiment of the invention is not limited. It can be, for example, Gas Metal Arc Welding (GMAW), Gas Tungsten Arc Welding (GTAW) also known as Tungsten Inert Gas Welding (TIGW), Submerged Arc Welding (SAW), Laser Beam Welding (LBW), Narrow Gap Welding, also known as narrow groove welding or Laser Arc Hybrid welding.

That said, the variant where the welding flux is also a shielding flux is particularly advantageous for the welding techniques using shielding fluxes, such as Submerged Arc Welding (SAW), Narrow Gap Welding based on Submerged Arc Welding and Laser Arc Hybrid Welding based on Submerged Arc Welding.

Finally, the invention relates to the use of a welding flux according to the present invention, of the corresponding pre-coating or of the corresponding flux-cored wire, for the manufacture, for example, of pressure vessels, offshore and oil & gas components, shipbuilding, automotive, nuclear components and heavy industry & manufacturing in general.

EXAMPLES

Example 1—Narrow Gap Welding

The steel substrate having the chemical composition in weight percent disclosed in Table 1 was selected:

| C | Mn | Si | Al | S | P | Cu | Ni | Cr | Nb | Mo | V | Ti | B | N | Fe |
|---|---|---|---|---|---|---|---|---|---|---|---|---|---|---|---|
| 0.12 | 1.65 | 0.15-0.55 | 0.015-0.050 | 0.002 | 0.0008 | 0.30 | 0.70 | 0.20 | 0.030 | 0.08 | 0.060 | 0.0025 | 0.0005 | 0.010 | Balance |

The steel substrate was 50 mm thick. It had a tensile strength of 470-630 MPa and a yield strength of 335 MPa.

Samples of 100×150 mm with sidewalls with 0° bevel were prepared. The sidewall to be welded was cleaned from oil and dirt with acetone.

Sample 1 was not coated with a pre-coating.

For sample 2, an acetone solution comprising $MgTiO_3$ (diameter: 2 μm), $Nb_2O_5$ (diameter: 100 nm) and $SiO_2$ (diameter: 10 nm) was prepared by mixing acetone with said elements. In the acetone solution, the concentration of $MgTiO_3$ was of 175 $g{\cdot}L^{-1}$, the concentration of $Nb_2O_5$ was of 50 $g{\cdot}L^{-1}$ and the concentration of $SiO_2$ was of 25 $g{\cdot}L^{-1}$. Then, the cleaned sidewall of sample 2 was coated with the acetone solution by spraying. The acetone evaporated. The percentage of $MgTiO_3$ in the pre-coating was of 70 wt. %, the percentage of $Nb_2O_5$ was of 20 wt. % and the percentage of $SiO_2$ was of 10 wt. %. The pre-coating was 50 μm thick.

For sample 3, an acetone solution comprising $MgTiO_3$ (diameter: 2 μm), $Nb_2O_5$ (diameter: 100 nm), $SiO_2$ (diameter: 10 nm), a 1:1:1 combination of premixed $La_2O_3$, $ZrO_2$ and $Y_2O_3$ (diameters: respectively 50, 40 and 40 nm) and $NaBiO_3$ (diameter: 1.5 μm) was prepared by mixing acetone with said elements. In the acetone solution, the concentration of $MgTiO_3$ was of 187.5 $g{\cdot}L^{-1}$, the concentration of $Nb_2O_5$ was of 25 $g{\cdot}L^{-1}$, the concentration of $SiO_2$ was of 25 $g{\cdot}L^{-1}$, the concentration of additional nanoparticulate oxides was of 0.125 $g{\cdot}L^{-1}$ and the concentration of $NaBiO_3$ was of 12.38 $g{\cdot}L^{-1}$. Then, the cleaned sidewall of sample 3 was coated with the acetone solution by spraying. The acetone evaporated. The percentage of $MgTiO_3$ in the pre-coating was of 75 wt. %, the percentage of $Nb_2O_5$ was of 10 wt. %, the percentage of $SiO_2$ was of 10 wt. %, the percentage of additional nanoparticulate oxides was of 0.05 wt. % and the percentage of $NaBiO_3$ was of 4.95 wt %. The pre-coating was 50 μm thick.

Samples 1 to 3 were each positioned side by side with a bare sample of the selected steel substrate spaced by a 13 mm gap and welded by Narrow Gap Gas Metal Arc Welding by conducting weld passes until the bevel was filled and the joint was complete. The welding parameters are in the following Table 2:

| Electric current (A) | Speed ($cm \cdot min^{-1}$) | Voltage (V) | Diameter negative electrode (mm) | Protective gas and flow (l/min) |
|---|---|---|---|---|
| 125 | 22 | 25-50 | 1.2 | Ar + 8% $CO_2$ 18 |

The composition of the consumable electrode used in all cases is in the following Table 3:

| C | Si | Mn | Fe |
|---|---|---|---|
| 0.078 | 0.85 | 1.46 | balance |

Sample 1 was welded in 12 passes while Samples 2 and 3 were welded in passes. This first result already shows that the pre-coating according to the invention increases the deposition rate and productivity of the narrow gap welding.

It was also observed that the wetting of the weld metal on the bevel surface was improved in Samples 2 and 3 compared to Sample 1.

After narrow gap welding, the weld of all welded assemblies was inspected first visually and secondly by ultrasound (both linear and volumetric). The welds were also analyzed macrographically and micrographically, notably by Liquid Penetrant Inspection (LPI).

Results are summarized in the following Table 4:

| Evaluation of welded samples | Sample 1 | Sample 2* | Sample 3* |
|---|---|---|---|
| Visual inspection of the joint | OK | OK | OK |
| Ultrasonic inspection of the joint | Not OK | OK | OK |
| Penetrating Liquids of the joint | OK | OK | OK |
| Macrographic analysis | Defects (lack of sidewall fusion and undercutting) | OK | OK |

*according to the present invention

Results show that the pre-coating on the sidewall of the steel substrate improves the narrow gap welding.

Example 2—Flux-Cored Wire

Three fluxes were prepared and introduced in a 0.5 mm C—Mn steel sheath so as to form a wire of 1.6 mm diameter. Their compositions were:

Flux 1: 85 wt % $MgTiO_3$ (diameter: 2 μm), 10 wt % $SiO_2$ (diameter range: 12-23 nm) and 5 wt % $Nb_2O_5$ (diameter range: 100 nm), Flux 2: 70 wt % $MgTiO_3$ (diameter: 2 μm), 10 wt % $SiO_2$ (diameter range: 12-23 nm) and 20 wt % $Nb_2O_5$ (diameter range: 100 nm), Flux 3: 68.5 wt % $MgTiO_3$ (diameter: 2 μm), 10 wt % $SiO_2$ (diameter range: 12-23 nm), 20 wt % $Nb_2O_5$ (diameter range: 100 nm), 1 wt % $Na_3AlF_6$ and wt % $CeO_2$ (diameter: 5 μm).

The corresponding flux-cored wires, identified respectively as Sample 4, 5 and 6, were tested, during bead-on-plate Gas Tungsten Arc welding with an intensity of 110 A and a voltage between 10.8 and 12.8V on a structural steel (C—Mn S355) whose composition is detailed in the following Table 5:

| C | Mn | Si | Al | S | P |
|---|---|---|---|---|---|
| 0.102 | 0.903 | 0.012 | 0.04 | 0.0088 | 0.012 |

During these tests, Samples 4, 5 and 6 were compared to the following commercial wires:

Outershield® MC710-H, which is a mild steel metal cored wire supplied by Lincoln Electric®. Its sheath is filled with iron powder (Sample 7), OK Tubrodur 15CrMn O/G, which is a flux-cored wire supplied by ESAB® and to be used for mild, low alloy and C—Mn steels (Sample 8). The exact composition of its flux is unknown.

The results obtained when using 500 mm of wire are detailed in Table 6:

| sample | Weld time (s) | Feed rate (mm/min) | Feed rate increase (compared to Sample 2) | Weld speed (m/min) | Weld speed increase (compared to Sample 2) |
|---|---|---|---|---|---|
| 4* | 230 | 127.83 | 31.2% | 43.04 | 22% |
| 5* | 221 | 139.17 | 42.8% | 45.44 | 28.9% |
| 6* | 202 | 144.95 | 48.7% | 46.63 | 32.2% |
| 7 | 301.5 | 97.46 | N.A. | 35.26 | N.A. |
| 8 | 249.5 | 116.31 | 19.3% | 37.15 | 5% |

*according to the invention

Results show that there is simultaneously a significant increase in welding speed and a significant increase in material deposition.

In addition, the widths of the deposited materials have been measured and compared. It appeared that the weld obtained with Samples 4, 5 and 6 was in average 18% larger than the one obtained with Sample 7 and 24% larger than the one obtained with Sample 8.

It shows that the components of the flux according to the invention make the surface tension decrease with temperature so that the wettability of the weld material increases along the edges of the melt pool.

Example 3—Gas Tungsten Arc Welding (GTAW)

For this example, the steel substrate having the chemical composition in weight percent disclosed in Table 7 was used:

| C | Mn | Si | Al | S | P | Cu | Ni | Cr | Nb | Mo | V | Ti | B | N | Fe |
|---|---|---|---|---|---|---|---|---|---|---|---|---|---|---|---|
| 0.102 | 0.903 | 0.012 | 0.04 | 0.0088 | 0.012 | 0.027 | 0.0222 | 0.027 | 0.0012 | 0.002 | 0.0011 | 0.0008 | 0.0001 | 0.0035 | Balance |

The steel substrate was 5.5 mm thick.

For Sample 9, an ethyl acetate solution comprising $MgTiO_3$ (diameter: 2 μm), $SiO_2$ (diameter range: 10 nm) and $Nb_2O_5$ (diameter range: 100 nm) was prepared by mixing ethyl acetate with said elements. In the ethyl acetate solution, the concentration of $MgTiO_3$ was of 175 $g{\cdot}L^{-1}$, the concentration of $SiO_2$ was of 25 $g{\cdot}L^{-1}$, the concentration of $Nb_2O_5$ was of 50 $g{\cdot}L^{-1}$. The ethyl acetate solution was sprayed on the steel substrate on an area wider than the weld to be done. The ethyl acetate evaporated. The percentage of $MgTiO_3$ in the pre-coating was of 70 wt. %, the percentage of $SiO_2$ was of 10 wt. % and the percentage of $Nb_2O_5$ was of 20 wt. %.

For Sample 10, a water solution comprising the following components was prepared: 363 $g{\cdot}L^{-1}$ of $MgTiO_3$ (diameter: 2 μm), 77.8 $g{\cdot}L^{-1}$ of $SiO_2$ (diameter range: 12-23 nm), 77.8 $g{\cdot}L^{-1}$ of $Nb_2O_5$ (diameter range: 100 nm) and 238 $g{\cdot}L^{-1}$ of 3-aminopropyltriethoxysilane (Dynasylan® AMEO produced by Evonik®). The solution was applied on the steel substrate and dried by 1) IR and 2) NIR.

The dried pre-coating was 40 μm thick and contained 62 wt % of $MgTiO_3$, 13 wt % of $SiO_2$, 13 wt % of $Nb_2O_5$ and 12 wt % of the binder obtained from 3-aminopropyltriethoxysilane.

For Sample 11, a water solution comprising the following components was prepared: 330 $g{\cdot}L^{-1}$ of $MgTiO_3$ (diameter: 2 μm), 70.8 $g{\cdot}L^{-1}$ of $SiO_2$ (diameter range: 12-23 nm), 70.8 $g{\cdot}L^{-1}$ of $Nb_2O_5$ (diameter range: 100 nm), 216 $g{\cdot}L^{-1}$ of 3-aminopropyltriethoxysilane (Dynasylan® AMEO produced by Evonik®) and 104.5 $g \cdot L^{-1}$ of a composition of organofunctional silanes and functionalized nanoscale $SiO_2$ particles (Dynasylan® Sivo 110 produced by Evonik). The solution was applied on the steel substrate and dried by 1) IR and 2) NIR. The dried pre-coating was 40 μm thick and contained 59.5 wt % of $MgTiO_3$, 13.46 wt % of $SiO_2$, 12.8 wt % of $Nb_2O_5$ and 14.24 wt % of the binder obtained from 3-aminopropyltriethoxysilane and the organofunctional silanes.

For Sample 9, the spraying was easy and the pre-coating was homogeneous, which confirms that ethyl acetate can easily replace acetone in the formulation of the solvented flux.

For Samples 10 and 11, the adhesion of the pre-coating on the steel substrate was greatly improved compared to Sample 9.

Gas Tungsten Arc Welding was then performed on Samples 9 to 11 and on an uncoated sample (Sample 12) with the welding parameters detailed in Table 8:

| Electric current (A) | Speed (mm.min-1) | Stick Out (mm) | Arc length (mm) | Gas flow: Ar (L.min-1) | Angle electrode | Diameter electrode (mm) |
|---|---|---|---|---|---|---|
| 160 | 80 | 3 | 1 | 8 | 60 | 3.2 |

Measurements done during welding showed that:

During welding of Sample 9, the arc was more stable and the average instant energy increased by 12% compared to the reference (Sample 12). Full penetration was achieved with Sample 9 contrarily to Sample 12, during welding of Samples 10 and 11, the arc was more stable and the average instant energy increased by 14% compared to the reference (Sample 12). Full penetration was achieved with Samples 10 and 11 contrarily to Sample 12.

What is claimed is:

1. A welding flux comprising:

a titanate selected from the group of titanates consisting of alkali metal titanates, alkaline-earth titanates, transition metal titanates, metal titanates, and mixtures thereof; and a nanoparticulate niobium compound chosen from the group consisting of niobium oxides, alkali niobates and mixtures thereof;

wherein the percentage of titanate in the flux is above or equal to 45 wt. %, the diameter of the titanate is between 1 and 40 μm, and the percentage of the nanoparticulate niobium compound in the flux is below or equal to 80 wt. %.

2. The welding flux as recited in claim 1, wherein the nanoparticulate niobium compound is chosen from the group consisting of: NbO, $NbO_2$, $Nb_2O_5$, and mixtures thereof.

3. The welding flux as recited in claim 1, wherein a percentage of the nanoparticulate niobium compound in the flux is between 2 and 50 wt. %.

4. The welding flux as recited in claim 1, wherein a percentage of the nanoparticulate niobium compound in the flux is between 2 and 30 wt. %.

5. The welding flux as recited in claim 1, wherein the nanoparticles of the nanoparticulate niobium have a size between 5 and 150 nm.

6. The welding flux as recited in claim 5, wherein the nanoparticles of the nanoparticulate niobium have a size between 50 nm and 150 nm.

7. The welding flux as recited in claim 1, wherein the percentage of titanate in the flux is between 45 and 90 wt. %.

8. The welding flux as recited in claim 7, wherein the percentage of titanate in the flux is between 55% and 87 wt. %.

9. The welding flux as recited in claim 1, wherein a diameter of the titanate is between 1 and 20 μm.

10. The welding flux as recited in claim 9, wherein the diameter of the titanate is between 1 and 10 μm.

11. The welding flux as recited in claim 1, further comprising at least one additional nanoparticulate oxide chosen from the group consisting of: $TiO_2$, $SiO_2$, $ZrO_2$, $Y_2O_3$, $Al_2O_3$, $MoO_3$, $CrO_3$, $CeO_2$, $La_2O_3$, and mixtures thereof.

12. The welding flux as recited in claim 11, wherein the at least one additional nanoparticulate oxide has a size between 1 and 60 nm.

13. The welding flux as recited in claim 11, wherein the percentage of the at least one additional nanoparticulate oxide in the flux is between 5 and 20 wt. %.

14. The welding flux as recited in claim 1, further comprising a solvent.

15. The welding flux as recited in claim 1, wherein the nanoparticulate compound is present from 1 to 200 g/L.

16. The welding flux as recited in claim 1, wherein the titanate is present from 100 to 500 g/L.

17. The welding flux as recited in claim 1, further comprising a binder precursor.

18. The welding flux as recited in claim 1, wherein the percentage of the nanoparticulate niobium compound in the flux is between 10 and 40 wt. %.

19. A method for the manufacture of a pre-coated steel substrate comprising the step of depositing at least partially on a steel substrate the welding flux as recited in claim 1.

20. A pre-coated steel substrate, obtainable by the method of claim 19, the steel substrate being at least partially coated with a pre-coating including a titanate and a nanoparticulate niobium compound chosen from the group consisting of: niobium oxides, alkali niobates, and mixtures thereof.

21. A method for the manufacture of a welded joint comprising the following successive steps:

providing at least two metallic substrates wherein a first of the at least two metallic substrates is a pre-coated steel substrate as recited in claim 20, and welding the at least two metallic substrates.

22. A flux-cored wire comprising the welding flux as recited in claim 1.

23. A method for the manufacture of a welded joint comprising performing arc welding or laser welding on a steel material with a flux-cored wire as recited in claim 22.

24. A method for the manufacture of a welded joint comprising the following successive steps:

providing at least two metallic substrates wherein a first of the two metallic substrates is a steel substrate, and welding of the at least two metallic substrates with a welding head while, simultaneously, applying on the at least two metallic substrates, ahead of the welding head, a welding flux as recited in claim 1.

25. A welding flux comprising:

a titanate; and a nanoparticulate niobium compound chosen from the group consisting of niobium oxides, alkali niobates, and mixtures thereof, wherein the titanate is chosen from the group consisting of: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$, and $ZnTiO_4$, and mixtures thereof.

* * * * *